United States Patent [19]

Ohe et al.

[11] Patent Number: 5,550,676
[45] Date of Patent: Aug. 27, 1996

[54] SURFACE LIGHT SOURCE ELEMENT

[75] Inventors: Makoto Ohe; Issei Chiba, both of Kawasaki, Japan

[73] Assignee: Mitsubishi Rayon Co., Ltd, Tokyo, Japan

[21] Appl. No.: 300,518

[22] Filed: Sep. 6, 1994

Related U.S. Application Data

[63] Continuation of Ser. No. 849,365, filed as PCT/JP91/01211, Sep. 12, 1991 published as WO92/04648, Mar. 19, 1992, abandoned.

[30] Foreign Application Priority Data

Sep. 12, 1990 [JP] Japan ................. 2-241538

[51] Int. Cl.⁶ ............... G02B 5/02; F21V 7/04
[52] U.S. Cl. ............... 359/599; 359/619; 362/26; 362/31
[58] Field of Search ................. 395/599, 619, 395/36, 40, 49; 362/26, 31, 223, 224, 339; 313/110; 345/90–98; 385/146, 33, 129, 901

[56] References Cited

U.S. PATENT DOCUMENTS

| | | | |
|---|---|---|---|
| 4,310,219 | 1/1982 | Jaccard | 359/599 |
| 4,673,254 | 6/1987 | Kab et al. | 359/599 |
| 4,729,068 | 3/1988 | Ohe | 359/599 |
| 4,985,809 | 1/1991 | Matsui et al. | 362/31 |
| 5,093,765 | 3/1992 | Kashima et al. | 362/31 |
| 5,134,549 | 7/1992 | Yokoyama | 362/31 |
| 5,178,447 | 1/1993 | Murase et al. | 362/31 |
| 5,283,673 | 1/1994 | Murase et al. | 362/31 |

FOREIGN PATENT DOCUMENTS

| | | |
|---|---|---|
| 0317250 | 5/1989 | European Pat. Off. . |
| 59-33077 | 2/1984 | Japan . |
| 01-245220 | 9/1989 | Japan . |
| 01-244490 | 9/1989 | Japan . |
| 01-252933 | 10/1989 | Japan . |
| 462361 | 12/1991 | Japan ................. 359/599 |

OTHER PUBLICATIONS

IBM Technical Disclousre Bulletin, vol. 29, No. 11, Apr. 1987, pp. 4838–4839, "Backlighting For Liquid Crystal Display".

Primary Examiner—Thong Q. Nguyen
Attorney, Agent, or Firm—Oblon, Spivak, McClelland, Maier & Neustadt, P.C.

[57] ABSTRACT

The present invention relates to a surface light source element used for a surface light source device, and in particular, to a surface light source element which can be used as a back light device for a liquid crystal display element. The surface light source element according to the invention is characterized in that at least one of the light emitting surface and the opposed surface of the transparent light guide has a directional light emitting function which radiates the incident light from the light incident surface of the transparent light guide in an oblique direction to the incident light and has a regulation function which makes the luminance of the light uniform over the light emitting surface in the whole surface thereof. According to the present invention, it is possible to provide a very thin type of a surface light source element which can produce emitted light with a uniform and high luminance.

11 Claims, 12 Drawing Sheets

LIGHT GUIDE-1

SAMPLE 1-① LUMINANCE AT +63° 308cd/m²

SAMPLE 1-② LUMINANCE AT 0° 285cd/m²

FIG.14b

LIGHT GUIDE-3

SAMPLE 3-① LUMINANCE AT 0° 208cd/m²

SAMPLE 3-② LUMINANCE AT 0° 215cd/m²

SURFACE LIGHT SOURCE ELEMENT

This application is a continuation of application Ser. No. 07/849,365, filed as PCT/JP91/01211, Sep. 12, 1991, published as WO92/04648, Mar. 19, 1992, now abandoned.

TECHNICAL FIELD

The present invention relates to a surface light source element used for a surface light source device, in particular, to a surface light source element which can be used as a back light device for a liquid crystal display element.

TECHNICAL BACKGROUND

Conventionally, a structure which comprises a tubular lamp as a light source located at the focal point of a paraboloid of revolution type of reflector and an opalescent diffusing plate located above the lamp, is generally used. Such a device is improved by adjustment of the shape of the reflector or of the diffusion coefficient of the diffusing plate.

There exists a device having a combination of a tubular lamp and a light guide with a shape which is simulated by an approximation of a point-like source of light and is formed in the shape of the approximated curve so that lights in a direction are emitted, a device having a light guide the thickness of which varies along the advance direction of light, a device using a lenticular member having angles of prisms which vary according to the distance from a light source, and a device having a combination of these elements.

Recently, surface light source elements have been used as liquid crystal display elements. However, the display device, which uses a conventional surface light source element to obtain a high quality display, requires a thick surface light source element. In particular, a surface light source element for a large display of 10 to 12 inches requires a thickness of 20 to 30 mm. Therefore, it is impossible to function as a thin surface light source element.

Various edge-light types of surface light source devices have been proposed. Each of the devices has a transparent light guide comprising a plate-shape transparent material such as an acrylic resin. Light incident on an edge portion of the transparent light guide is then emitted from the upper or lower surface of the light guide. However, such a large liquid crystal display device with a size of 10 to 12 inches results in a display with darkness corresponding to the distance from the light source or an uneven display, so that a display of high quality cannot often be obtained.

In order to solve this problem, a light guide having a thickness which varies according to the distance from a lamp, or a member which varies light path geometrically, is provided. However, such a member requires a precise processing to form a specific shape, and high processing costs. Furthermore, the member provides a low utilization rate of light.

Recently, Japanese Patent Application Laid-open No. (Tokukai-Hei) 1-245220 discloses a surface light source element which is an edge-light type. The surface light source element has a light guide with a layer of a light diffusing material which is applied or adhered on the surface thereof opposed to a light emitting surface or on a light diffusing surface of a provided member. The density of the provided light diffusing material increases as the distance from the light incident portion increases. Japanese Patent Application Laid-open No. (Tokukai-Hei) 1-107406 discloses a surface illuminating device which can uniformly illuminate the whole surface of a light diffusing plate. The device has a plurality of piled transparent plates, each of which has a different pattern of fine dots (light diffusing material) thereon.

Since a non-light-transmissive inorganic material (e.g., white pigment such as titanium oxide or barium sulfate) is used, a loss of light occurs to lower the luminance of the emitted light.

One has reported a light diffusing device which comprises a light guide, a diffusing layer provided on the light guide through a layer having a middle characteristic between those of the light guide and the diffusing layer, and a light regulation member for obtaining a uniform emitting light on the diffusing layer, in Japanese Utility Model Application Laid-open No. (Jitsukai-Sho) 61-171001 and in U.S. Pat. No. 4,729,068.

The inventors have proposed a surface light source element which is an edge-light type, as described in Japanese Patent Application Laid-open Nos. (Tokukai-Hei) 1-244490 and 1-252933. The element has a lens-like surface or a satin finished surface provided on at least one of a light emitting surface of a light guide and the opposed surface thereof, and a light regulation member having a light reflecting pattern which corresponds to the reciprocal of an emitting light distribution and a light diffusing plate provided on the emitting surface of the light guide.

The light diffusing device and the surface light source element using the light regulation member show excellent effects regarding the uniformity of the emitted light. The device and the element, however, cannot reuse the light which is reflected by the emitting light regulating member, so that the luminance of the emitted light lowers near the minimum value of the luminance before regulation.

The object of the present invention is to provide a very thin type of surface light source element which can supply emitted light with a uniform and high luminance.

DISCLOSURE OF THE INVENTION

The surface light source element according to the present invention comprises a transparent light guide (1) which has a side end surface as a light incident surface, a surface perpendicular to the light incident surface as a light emitting surface, and a light reflecting layer provided on an opposed surface to the light emitting surface; and a diffusing member (2) for diffusing light from the light emitting surface of the transparent light guide; wherein at least one of the light emitting surface and the opposed surface of said transparent light guide has a directional light emitting function which radiates the incident light from the light incident surface of the transparent light guide in an oblique direction to the incident light and has a regulation function which makes the luminance of the light through the light emitting surface uniform over the whole surface thereof.

Generally, the amount of light from the light emitting surface which is incident on the light guide decreases as the distance from the light incident surface increases due to light emitting through the light emitting surface and light absorption inside the light guide. In the surface light source element according to the present invention, the ratio of the flat areas increases as the distance from the light incident surface decreases. Therefore, even if the transparent light guide is thin, it is possible to emit light with a uniform luminance over the entire emitting surface on the basis of the incident light. The incident light into the transparent light guide is not wasted and has a high utilization rate. Consequently, it is possible to produce emitted light having a high luminance without increasing the wattage of the light source. Therefore, the present invention provides a very thin type of surface light source element which can supply an emitting light with a uniform and high luminance.

BRIEF DESCRIPTION OF THE DRAWINGS

FIGS. 1 (a) and (b) are sectional views showing a construction of a conventional surface light source element;

FIGS. 5 (a)–(e) are schematic views showing embodiments of plan patterns of flat areas;

FIGS. 6 (a)–(c) are schematic sectional views showing various kinds of lens units;

FIGS. 7 (a)–(b) are partially sectional views showing modified embodiments of the surface light source element of the present invention;

FIGS. 11 (a) and (b) are plan views showing a manufactured light guide;

FIGS. 14 (a) and (b) are graphs showing a measurement results of directional emitting angles of a manufactured surface light source element;

BEST MODE OF CARRYING OUT THE INVENTION

The surface light source element of the present invention will be described in detail.

Figure 1A:
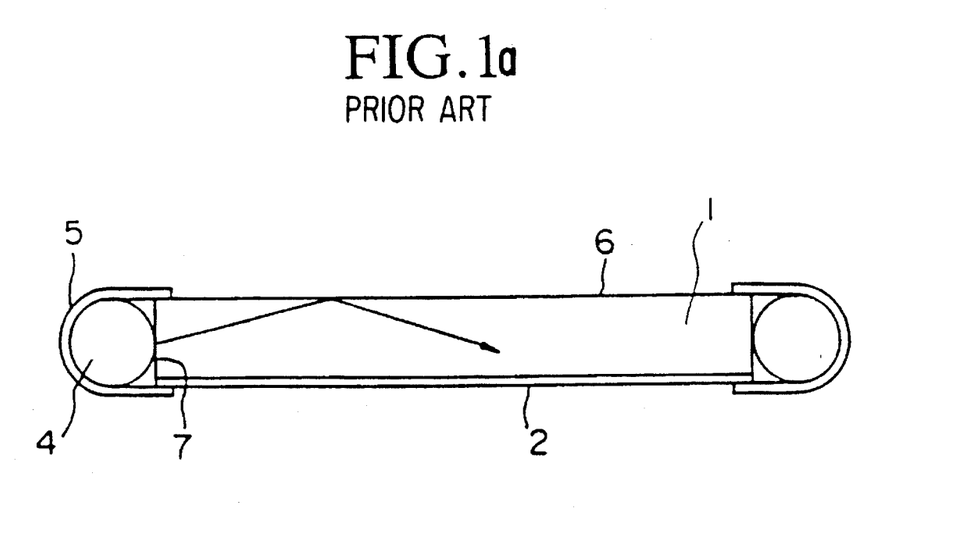
Figure 1B:
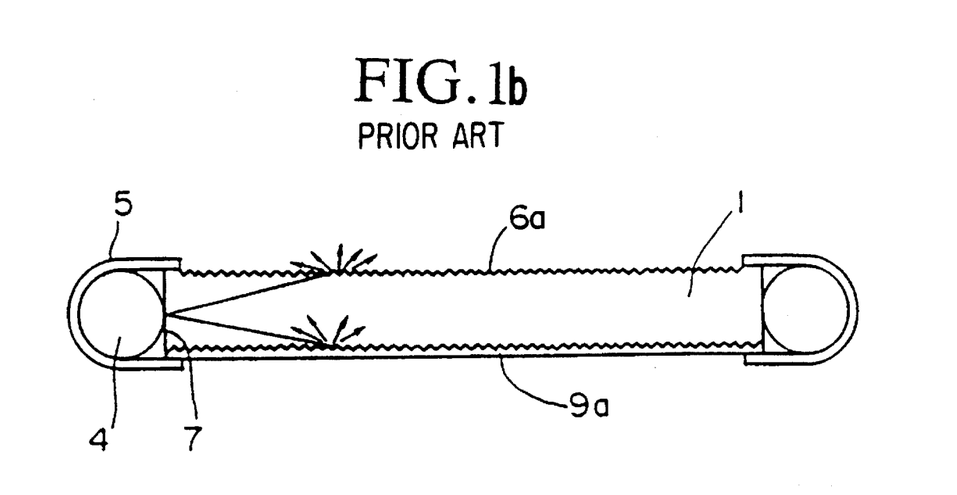

First, the basic principle of a surface light source element according to the present invention will be explained. The refractive indexes n of a transition from light guide to air are approximately 1.4 to 1.6. In the system of edge-light of which the incident surface 7 is perpendicular to an emitting surface 6 as shown in FIG. 1 (a), light theoretically cannot radiate from the emitting surface 6 when the critical angle of incidence is about 45°. In FIG. 1(a), the numeral 4 indicates a light source such as a fluorescent lamp, the numeral 5 indicates the reflector therefor, and the numeral 2 indicates reflective surface formed at the opposed side of the emitting surface 6 of the light guide 1.

The emitting surface 6 is generally formed to be a surface 6a treated in light diffusion or the reflective surface 2 is formed to a diffusing reflective surface 9a.

The inventors have studied diffusing treatment for at least the surfaces of a light guide and the opposed surface thereof, in order to increase the amount of emitted light. Consequently, it has been found that a method using surface roughening on these surfaces as uniformly as possible and a method using a plurality of lens units for radiating light in a predetermined direction are each more effective than the method of using application of a light diffusing material on at least one of the surface of the light guide and the opposed surface thereof or the method of using formation of a light diffusing material layer on the surface when an acrylic plate is made by polymerization.

Figure 2:
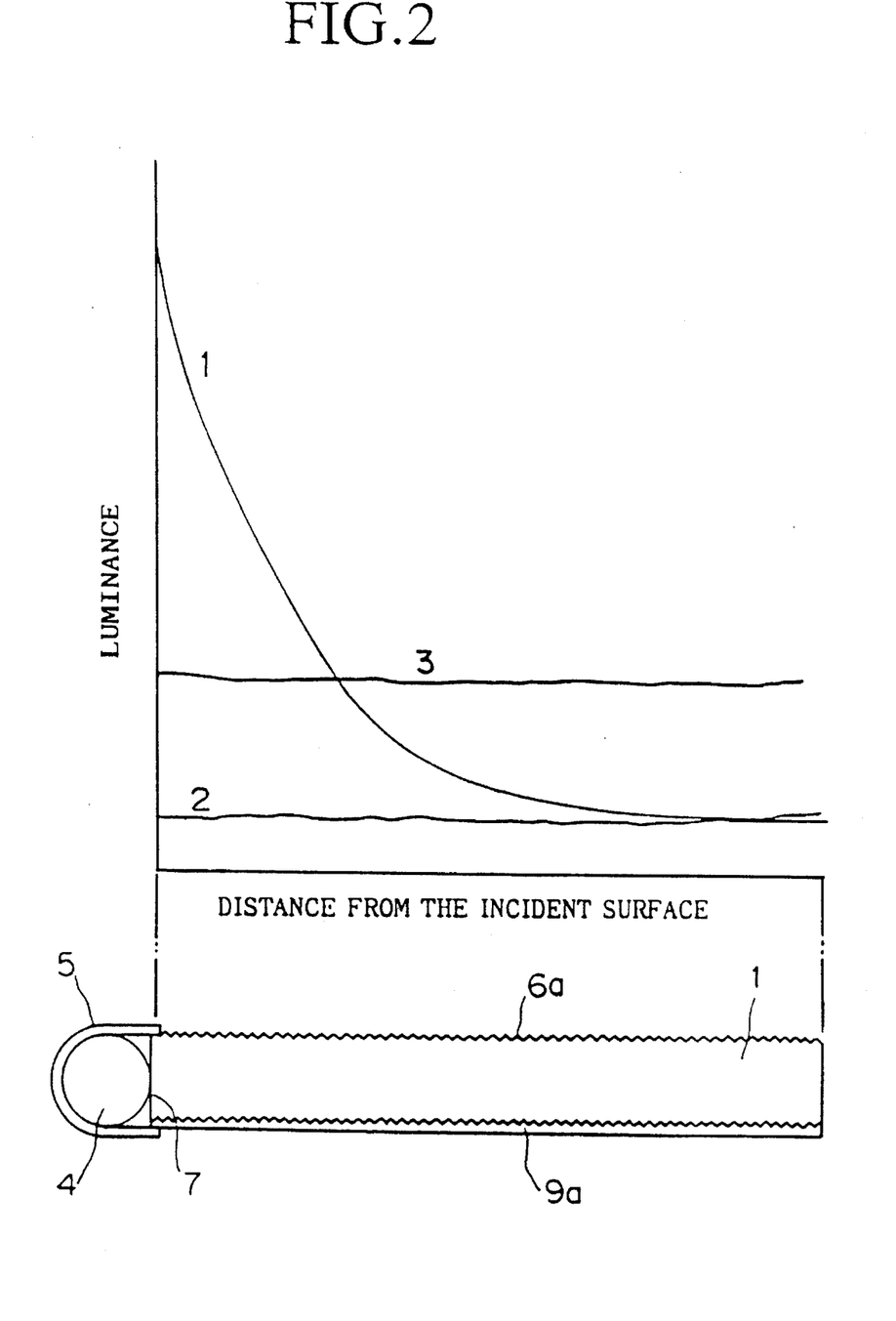
FIG. 2 is a view showing the change of luminance to the distance from the light incident surface of various kinds of surface light sources.

A surface light source element which comprises a light guide with a roughened surface, a fluorescent lamp with a surrounded silver-evaporated polyester film as a reflector provided on an end surface thereof, and a white film as a reflective member provided in contact with the toughened surface, was made to measure the luminance of the light emitted therefrom. Consequently, the luminance of the emitted light decreases as the distance from the fluorescent lamp increases. When the distance is 70 to 80 times the thickness of the light guide, the luminance is about $\frac{1}{10}$ that at the distance zero. This is shown by the line 1 in FIG. 2. The inventors have proposed providing uniform luminance by providing a light transmissive sheet for regulating the emitting light in Japanese Patent Application Laid-open Nos. (Tokukai-Hei) 1-244490 and 1-252933, as described above. According to this method, it is possible to make the luminance of the emitted light uniform. However, this method lowers the value of luminance of the overall emitted light to about $\frac{1}{10}$ to $\frac{1.5}{10}$ of that near the incident end portion. In this method, utilization of the incident light energy passing through the light guide was not performed efficiently. This is shown by the line 2 in FIG. 2. The reason for this is that the light transmissive sheet for regulating the emitting light can cut the emitting light but cannot reuse the cut light because of a regulating pattern reflecting the light.

Therefore, the inventors have developed a surface light source element so as to use the incident Light as efficiently as possible, in order to maintain uniform luminance while providing increased brightness. In the surface light source element of this invention, light emission is not performed by using the regulating pattern of a light transmissive sheet for regulating the emitted light, or by applying a light diffusing material on the opposed surface of the light emitting surface so that the density of the material is greater as the distance from the light incident portion increases, as disclosed in Japanese Patent Application Laid-open No. (Tokukai-Hei) 1-245220. The transparent light guides reported in Japanese Patent Application Laid-open Nos. (Tokukai-Hei) 2-17, 2-84618 and 2-176629 emit a large amount of light and have an interface for reflection having a small optical loss of light. The present invention uses those functions to regulate the amount of emitted light so as to make the luminance value on the light emitting surface uniform.

That is, in the surface light source element according to the present invention, roughened surfaces or a plurality of lens units, each of which has a directional light emitting function which radiates the incident light from the light incident surface of the transparent light guide at an oblique direction relative to the incident light direction, are provided on at least one of the light emitting surface and the opposed surface thereof; and flat areas are provided on the roughened surfaces or the plural lens units so that the ratio of the flat areas thereon increases as the distance from the light incident surface decreases, thereby the transparent light guide has a regulation function which makes the luminance of the light through the light emitting surface uniform over the whole surface thereof. Accordingly, it is possible to increase the value of luminance of overall emitted light to about 3/10 of that near the incident end portion and to obtain a surface light source element showing a uniform luminance value over the entirety of the light emitting surface. This is shown by the line 3 in FIG. 2.

EMBODIMENT

The surface light source element of the present invention will be described concretely via the embodiments.

Surface Light Source Element

Figure 3:
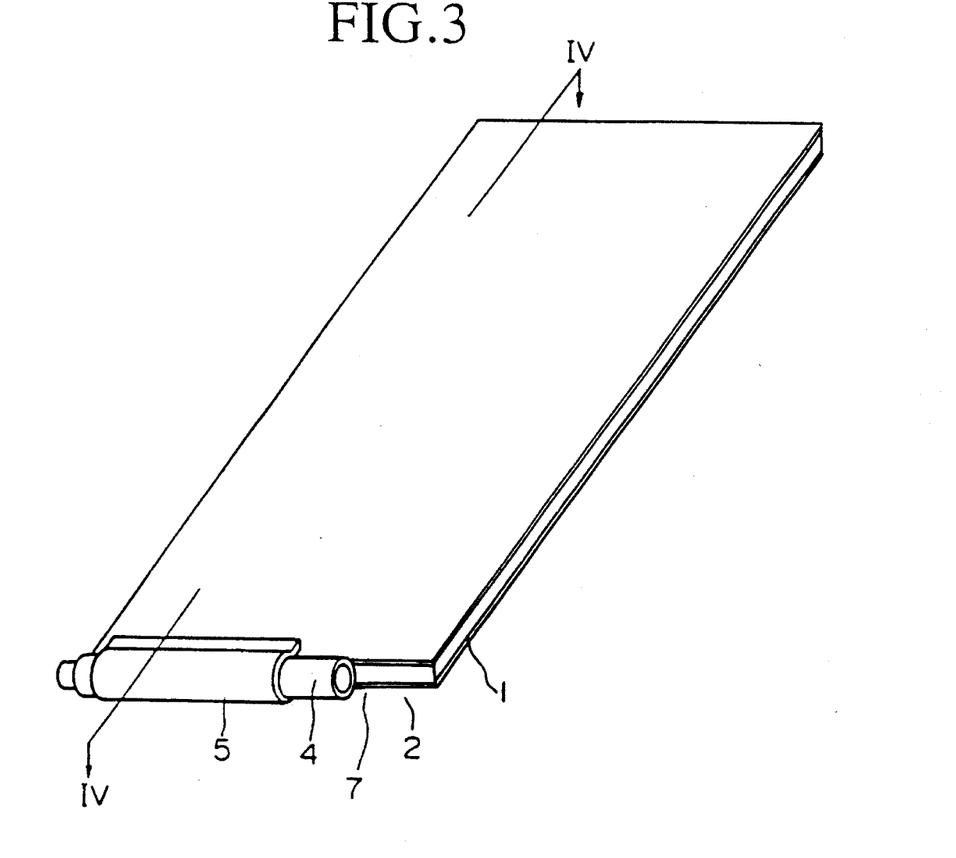
FIG. 3 is a partially fragmentary and perspective view showing a back light device incorporating a surface light source element according to an embodiment of the present invention.
Figure 4:
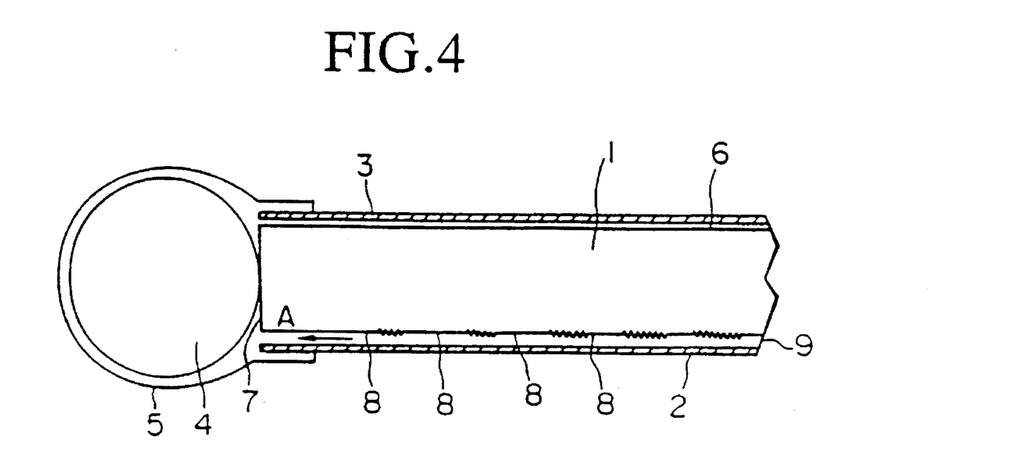
FIG. 4 is a partially sectional view taken along line IV—IV of FIG. 3.
Figures 5A, 5D:
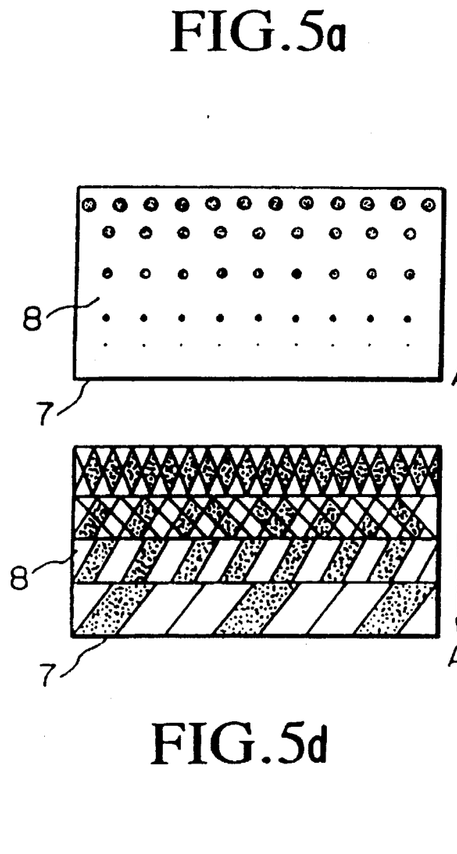
Figure 5B:
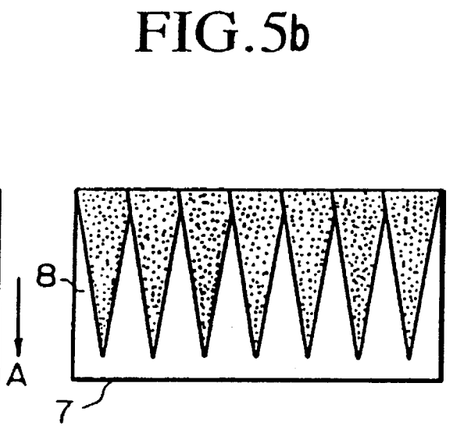
Figure 5C:
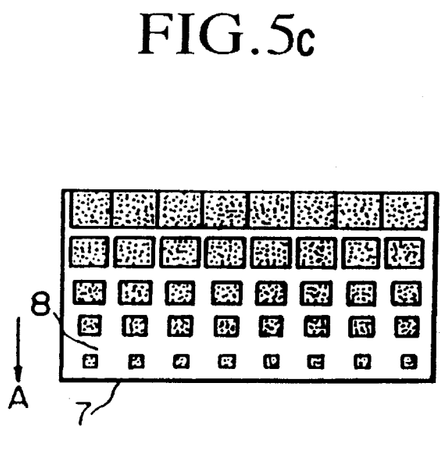
Figure 5E:
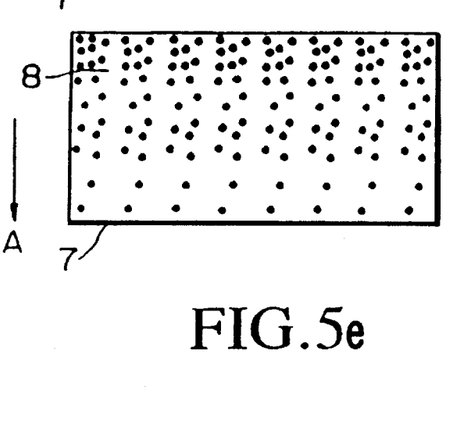

FIG. 3 shows an embodiment of a back light device incorporating a surface light source element according to the present invention. FIG. 4 shows a partially sectional view taken on line IV—IV of FIG. 3.

The device comprises a light guide 1 with a rectangular plate shape, a film-like light diffusing member 3 provided over the light emitting surface 6 thereof, a light source 4 such as a fluorescent lamp provided on the side end surface (a light incident surface 7) of the light guide 1, and a reflector 5 for holding the light source 4 and reflecting light to the incident surface by the reflective surface provided on the inner surface thereof. The opposite side of the light emitting surface 6 of the light guide 1 has a light reflective layer 2.

The surface light source element according to the present invention is characterized in that roughened surfaces or a plurality of lens units, each of which has a directional light emitting function which radiates the incident light from the light incident surface of the transparent light guide in an oblique direction to the incident light, are provided on at least one of the light emitting surface and the opposed surface thereof; and flat areas are provided on the roughened surfaces or the plural lens units so that the ratio of the flat areas thereon increases as the distance from the light incident surface decreases, thereby said transparent light guide has a regulation function which makes the luminance of the light through the light emitting surface uniform over the entire surface thereof.

In this embodiment, flat areas 8 are provided on the roughened opposed surface 9 to the light emitting surface 6, so that the flat areas 8 are more numerous as the distance from the light incident surface 7 decreases, as shown by arrow A in FIG. 4.

The increasing ratio of the flat areas in the light guide can be selected, changed and determined appropriately according to the shape or pattern of the flat areas, the material or shape of the light guide, the kind of the light source, the treatment degree of the light emitting or reflecting surface or the like.

Pattern examples of the flat areas are shown in FIGS. 5 (a) to (e). In every example, the area ratio of the flat areas 8 increases as a position is nearer the light incident surface 7, as shown by arrow A in FIG. 5.

The diffusing member 3 which can be used for the present invention may be any structure or material which can diffuse light from the light guide nondirectionally. The diffusing member 3 can be provided on the light guide 1 by the end portion of the light guide adhering to the diffusing member 3 by an adhesive, by compulsory close contact through pressure, or by merely positioning the diffusing member 3 on the light guide. Furthermore, it is possible to laminate the light guide 1 and the diffusing member 3 directly or through a layer of air.

The light guide 1 in the present invention can be obtained by a transparent resin such as an acrylic resin, a polycarbonate resin or a vinyl chloride resin. In particular, it is preferable to use an acrylic resin having a large transmission coefficient of visible light. The method of molding the light guide 1 can be selected or changed appropriately.

The light source 4 in the present invention is not limited. A fluorescent lamp or a filament lamp which is a continuous tubular light source, a plurality of point-like sources of light arranged along the incident surface, or a light source device comprising a combination of a light transmissive member which can receive light through a side surface and a light source provided near the end portion incident surface of the light transmissive member, can be used as a light source.

The reflecting layer 2 of the surface light source element according to the present invention can be formed by laminating a reflecting film or the like which comprises a film and an evaporated metal such as Ag, Al or the like. It is preferable to use a reflecting material having a high reflectivity.

In this invention, the light guide requires at least one of the light emitting surface 6 and the opposed surface being roughened, or a plurality of lens units being formed. Furthermore, it is necessary to provide flat areas on the roughened surface or on the surface on which a plurality of lens units are formed, so that the ratio of the flat areas thereon increases as the distance from the light incident surface decreases.

In a preferred embodiment of the present invention, the surface of the flat areas 8 in the light guide 1 is preferably an optically flat surface, in particular, to be a mirror surface. The incident light with an incident angle more than the critical reflective angle to the optical flat surface can be reflected almost without loss.

Since the light does not leak, it is possible to use the light effectively to increase the luminance of the entire light emitting surface.

Figure 6A:
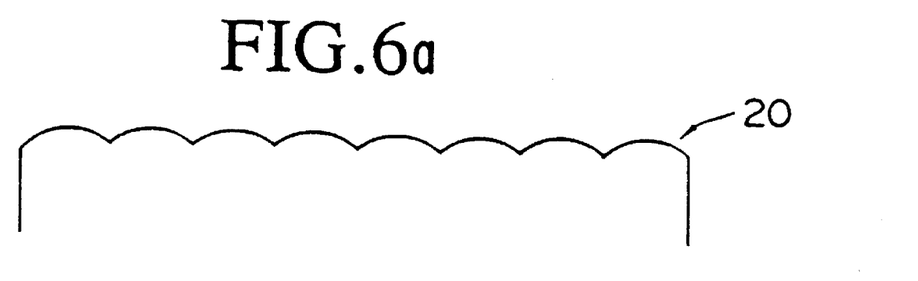
Figure 6B:
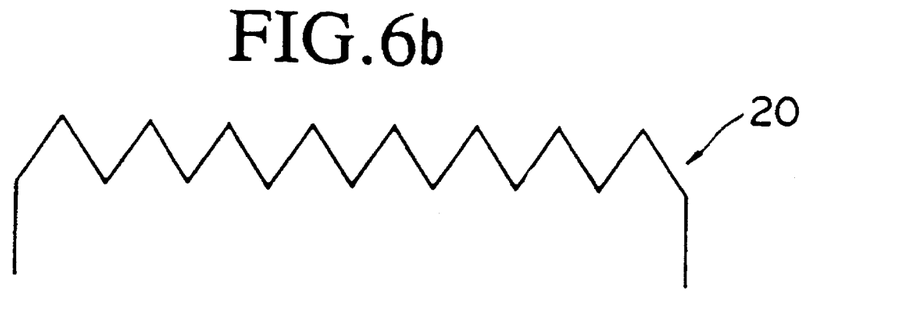
Figure 6C:
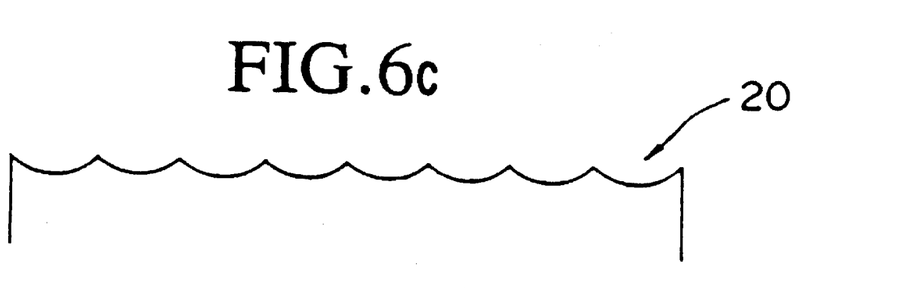

The shape of the lens unit which is used in the present invention is not limited. For example, a lens unit with a shape proposed in Japanese Patent Application Laid-open No. (Tokukai-Hei) 2-17 by the inventors can be used. Lenses 20 having various shapes are shown in FIGS. 6(a) and (b).

The roughened surface which is used in the present invention preferably has a haze value of not less than 30%, and more preferably, not less than 50%, in the toughened surface portion.

Figure 7A:
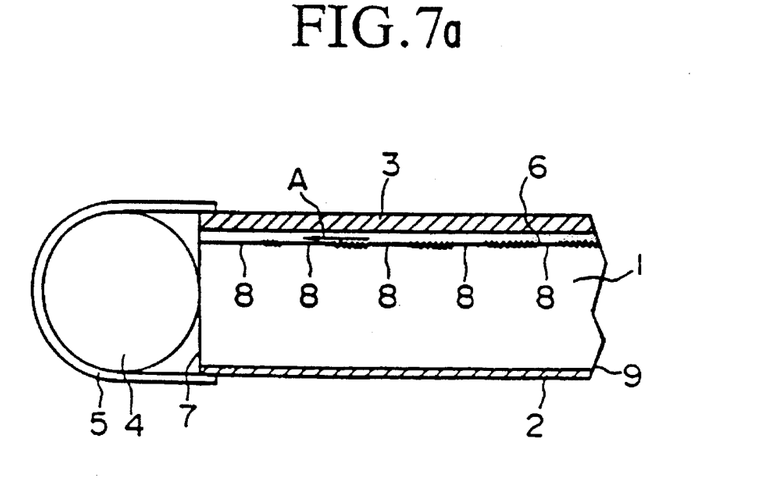
Figure 7B:
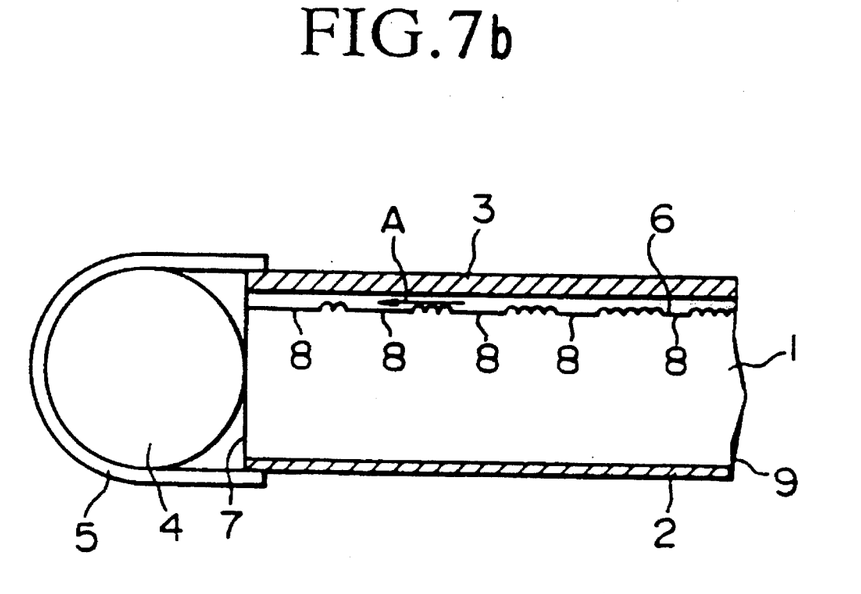

The surface light source element according to the present invention is not limited to the above embodiment. Various changes or modifications in form and details may be made therein. For example, in the above embodiment, flat areas 8 are provided on the toughened surface 9 opposed to the light emitting surface 6. However, flat areas 8 can be provided on the roughened light emitting surface 6, as shown in FIG. 7(a) or on the lens surfaces between the flat areas 8, as shown in FIG. 7(b). It is possible to provide a structure so that the area ratio of the flat areas thereon increases as the distance from the light incident surface 7 decreases, as shown by arrow A in FIG. 7.

Figure 8:
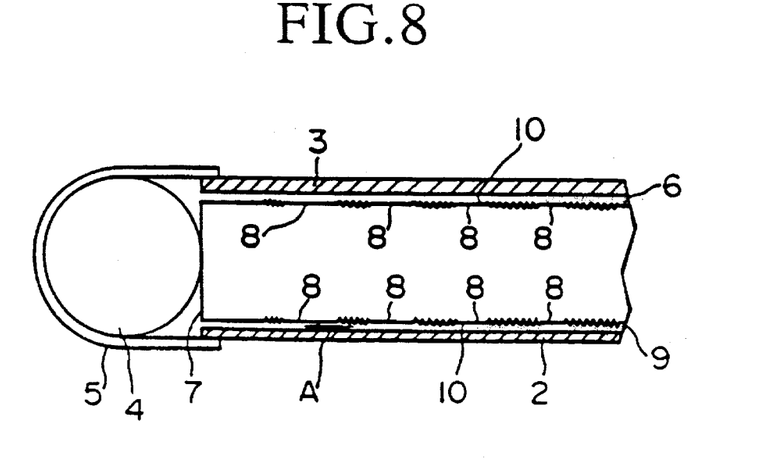
FIG. 8 is a partially sectional view showing a modified embodiment of the surface light source element of the present invention.

Furthermore, it is possible to provide the flat areas on both roughened surfaces of the light emitting surface 6 and of the opposed surface 9, as shown in FIG. 8. It is possible to provide a structure so that the area ratio of the flat areas thereon increases as the distance from the light incident surface 7 decreases, as shown by arrow A in FIG. 8.

Figure 9:
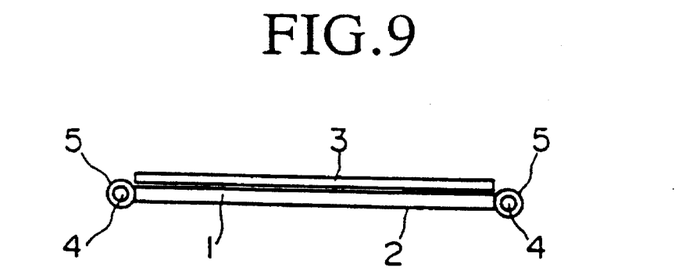
FIG. 9 is a schematic side view showing a modified embodiment of a back light device.

In the above embodiment, the light source 4 is provided only on one end side of the light guide 1. It is possible to provide the light source 4 on both ends sides of the light guide 1, as shown in FIG. 9.

Regulating Method of the Surface Light Source Element

The surface light source element according to the present invention can be regulated and manufactured by various kinds of methods.

For example, when the flat areas are provided on a roughened surface of the light guide or on a surface having lens units, it is possible to manufacture desired light guides by using a method in which flat areas are provided on a roughened surface or on a surface having lens units or by using a method in which toughened parts or lens units are provided on a flat surface.

A die having a desired roughened pattern or a surface roughness, or a die having specific lens units and flat areas is prepared by surface roughening treatments such as sandblasting, etching or the like. A light guide, which has predetermined flat areas on at least one of a light emitting surface having a roughened surface or lens units and an opposed surface thereof, can be obtained by an injection molding of a resin or by a heat-press using such a die. In particular, the injection molding method is preferable because of high precision and high molding speed.

The manufacture of the surface light source element can be performed by preparation of necessary members such as a light guide, a diffusing member, a reflecting material and the like, and by then assembling them.

DETAILED EMBODIMENT

Manufacture of a Die for a Tight Guide

Glass beads were blown on a polished surface of a brass plate, so that a metal plate on which surface roughening is carried out by a usual forming process was manufactured (Die 1).

Figure 10:
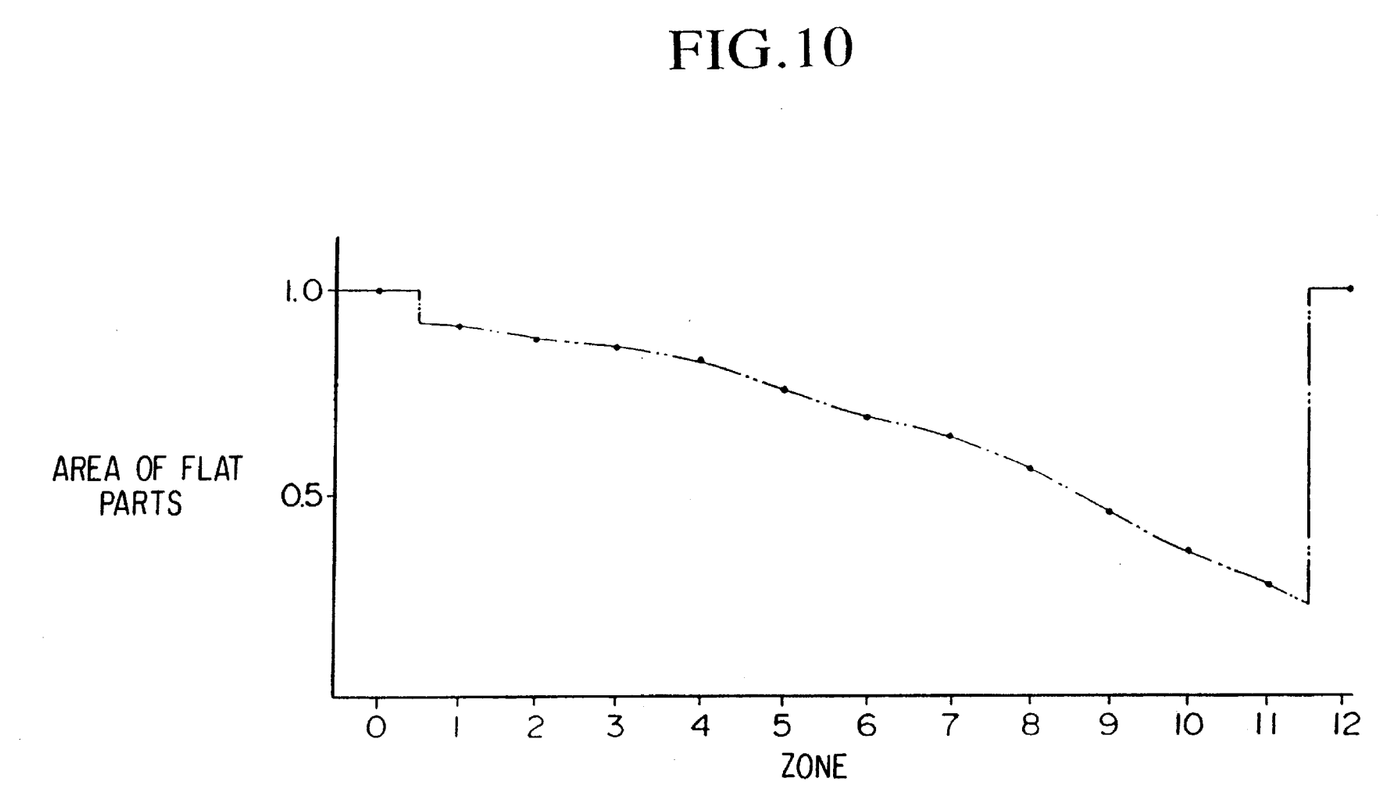
FIG. 10 is a graph showing an area ratio distribution of flat areas in a pattern formed on a mold for manufacturing a light guide used for embodiments of the present invention.
Figure 11A:
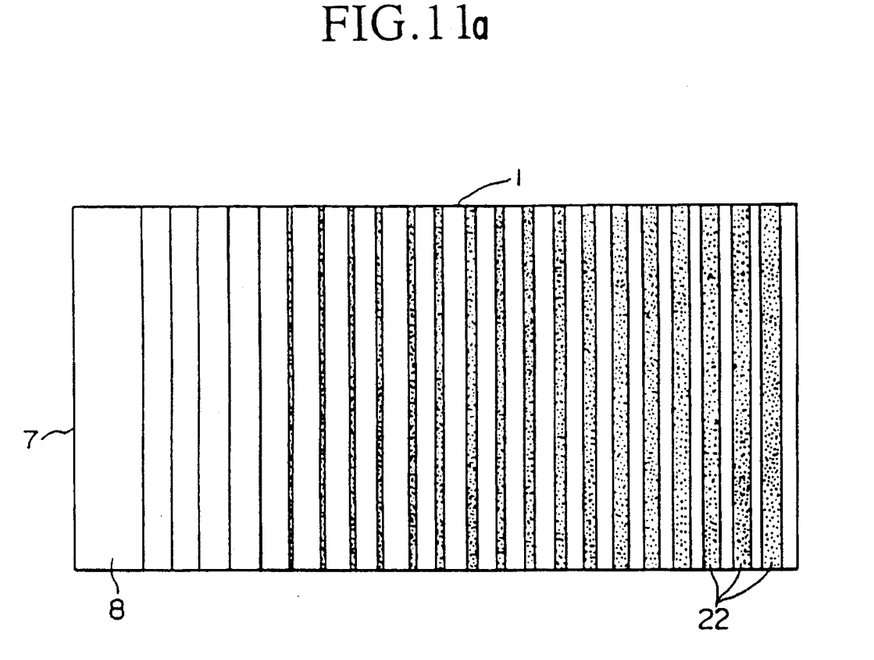

A gradation pattern having a distribution of area ratio of the flat areas as shown in FIG. 10 was formed by using CAD. A pattern was developed and printed photo-optically on the surface of the Die 1 by a usual photolithography process. The portion to remain as roughened surfaces, that is the portion similar to the rough parts 22 as shown in FIG. 11(a), was protected by a film. The remaining portion was polished to a degree of roughness with an emery-paper No. 800. Thereafter, a die having predetermined flat areas was made by removing the protecting film (Die 2).

FIG. 10 shows the ratio of the area of the flat areas to the total are in each of zones 0–12. The ratio for zones 0–12 that are shown in FIG. 10 are as follows:
(zone 0) 1.00,
(zone 1) 0.92,
(zone 2) 0.88,
(zone 3) 0.86,
(zone 4) 0.82,
(zone 5) 0.75,
(zone 6) 0.68,
(zone 7) 0.64,
(zone 8) 0.55,
(zone 9) 0.45,
(zone 10) 0.36,
(zone 11) 0.27,
(zone 12) 1.00.

Figure 11B:
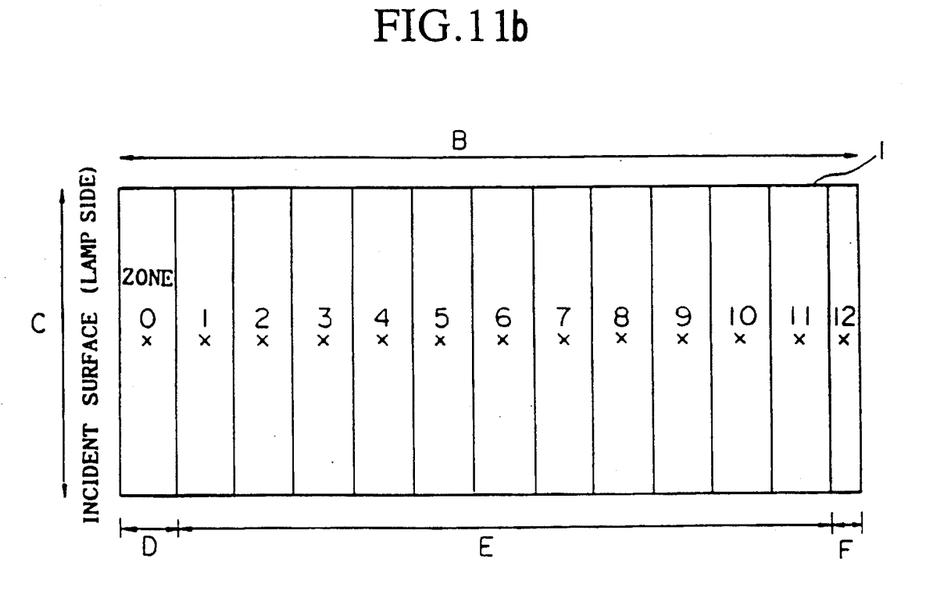
Figure 12:
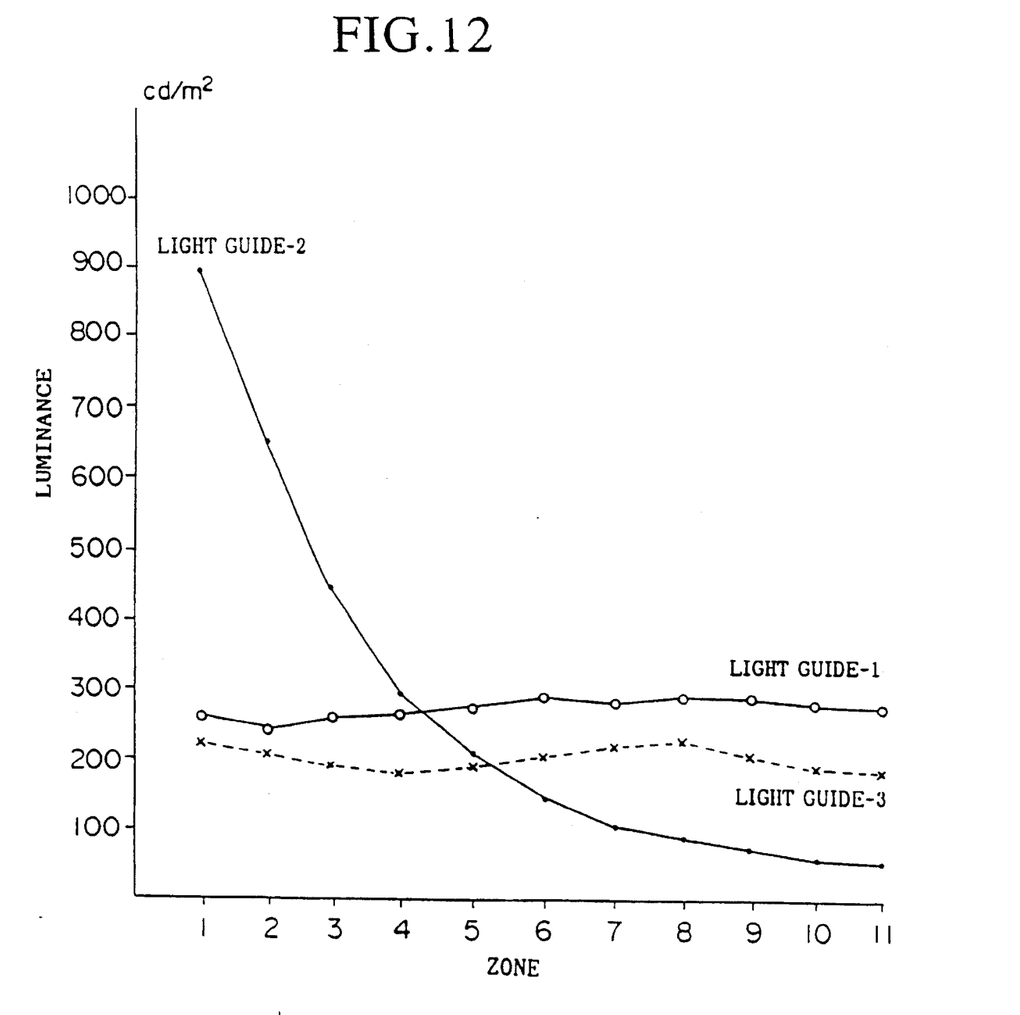
FIG. 12 is a graph showing a measurement result of a luminance distribution of the respective surface light source elements.

FIGS. 11(a) and (b) illustrate an example in which the zones have the area ratios shown in FIG. 10. The area ratio for the zones of the light guide according to FIGS. 11(a) and (b) provide the uniform and high intensity light guide luminance that is shown in FIG. 12 for LIGHT GUIDE 1.

The surface light source element of the invention may also include:

a cylindrical light source means for generating light; a transparent light guide having a light incident surface facing the cylindrical light source means, a light emitting surface that is perpendicular to the light incident surface, an opposed surface opposing the light emitting surface, and a light reflecting layer provided on the opposed surface;

wherein incident light that is generated by said cylindrical light source means enters said transparent light guide through said light incident surface and propagates along an incident light direction;

a diffusing means for diffusing light exiting from the light emitting surface, said diffusing member facing the light emitting surface;

wherein at least one of the light emitting surface and the opposed surface has flat areas which are optically flat and non-flat areas which are not optically flat and have a haze value of at least thirty percent, whereby said non-flat areas radiate light from the transparent light guide in a direction that is oblique to said incident light direction.

Moreover, the invention may include the foregoing structure and wherein a sum of areas of said flat areas of said at least one of the light emitting surface and the opposed surface decreases with increasing distance from said light incident surface; said light incident surface is elongated along a first direction and said light incident surface has a first length along said first direction. Moreover, the invention may include the foregoing structure and wherein said transparent light guide has a transparent light guide thickness between said light emitting surface and said opposed surface along a second direction that is perpendicular to said first direction, said transparent light guide has a far end that is opposite said light incident surface and which is a distance X from said light incident surface along a third direction that is perpendicular to both said first direction and said second direction, said at least one of the light emitting surface and said opposed surface consists of a plurality of rectangular zones, each one of said plurality of rectangular zones have a straight border that is parallel to said light incident surface along said first direction and a zone width along the third direction.

A surface of a brass plate was polished by a buff with an emery-paper No. 800, and then a mirror plate was made (Die 3).

A combined die for injection molding which had one surface with a state similar to that of the Die 2 and had the other surface with a state similar to that of the Die 3, was made (Die 4).

Manufacture of a Light Guide

An acrylic resin plate of 150 mm×250 mm with a thickness of 3 mm was sandwiched between the Die 2 and the Die 3 and a replica was formed by a conventional heat-press process. Then, the replica was cut to the size and pattern position as shown in FIGS. 11(a) and (b). The four cut sides were polished to have mirror surfaces in a conventional manner (Light guide 1).

In FIG. 11(a), numeral 22 indicates toughened surface parts. In FIG. 11(b), the light guide 1 has a Length (B) of 225 mm, a width (C) of 132 mm, a width of a zone "0" (D) of 15 mm, an effective width (E: a width of zones "1" to "11") of 205 mm, and a width (F) of zone "12" of 5 mm.

An acrylic resin plate of 150 mm×250 mm with a thickness of 3 mm was sandwiched between the Die 1 and the Die 3 using a process similar to the above process and a replica was formed by heat-pressing. Then, the replica was cut and polished to produce a light guide (Light guide 2).

A negative EP picture was made as a comparative example so that ink could be applied on the rough corresponding parts of the Die 2 by a screen printing process. A print form for screen printing was made by using this. Screen printing was carried out on a surface of an acrylic resin plate of 150 mm×250 mm with a thickness of 3 mm using a commercially available white ink (VIC 120 White made by Seiko-Advance Co., LTD.). Thereafter, this was cut and polished in a similar manner to that of the light guide 1 or of the light guide 2 to make a light guide for comparison (Light guide 3).

Light guides were made from acrylic resin pellets (Acrypet VH made by Mitsubishi Ravon Co.) at a cylinder temperature of a 240° C. by using a 200 t-injection molding machine and the Die 4.

Measurement of the Haze Value of the Light Guide 2

Pieces of sample of 50 mm×50 mm were cut out from the roughened surface parts of the light guide 2, and the haze value thereof was measured according to ASTM-D 1003-61. The haze value was calculated according to the following equation.

Haze value={(Transmittance of diffused light)/(Total transmittance light)}×100%

Consequently, the haze value of the light guide 2 was 64.8.

Assembly of the Surface Light Source Element

A crystal white plate produced by Sky Aluminium Co. (an aluminum plate with a thickness of 0.25 mm, a surface of which is coated with a white paint) was positioned in a folded state with an inner white surface so that the plate had a rib with a width of 3 mm and a flat portion with a size of 132 mm×225 mm. At least one of two short sides had no rib, so that the short side can function as a light incident surface. This plate is the light reflecting member. A milk white polyethyleneterephthalate film "EK 300 W" produced by Somar Co., with a thickness of 0.075 mm, was cut to size of 132 mm×225 mm to use as a diffusing member.

A cylindrical member having an inner diameter of 6 mm and a crystal white inner surface was produced as a lamp case. The lamp case has an aperture with an opening width of 3 mm.

The light guide was placed on the light reflecting member so that the "0" zone as shown in FIG. 11 (b) was adjacent to the short side without rib of the light reflecting member and the roughened surface or the printed surface was close to the white surface thereof. The diffusing member was placed on the light guide. These three members were inserted into the aperture of the lamp case together. A lamp "KC 130 T4E74" produced by Matsushita Electric Industry Corporation with a diameter of 4 mm and a length of 130 mm was set in the lamp case as a surface light source element. "CXA-L10L" produced by TDK Corporation was used as an inverter for lighting a lamp. The lamp was lighted by application of DC 12 V.

Measurement of Luminance of the Surface Light Source Element

Luminance of the surface light source element was measured by a luminance meter "BM-5" produced by Topcon Co. through a view angle of 1° and a measurement circle of 10 to 15 mm in diameter. The measurement was carried out at the central portion of the zones "1" to "11" as shown in FIG. 11. The surface light source element was fixed at a predetermined measurement pedestal perpendicularly thereto so that the lamp was in an upper side. After lighting had been carried out by application of DC 12 V, the measurement was carried out through a lamp aging time of more than 15 minutes. The condition of temperature for measurement was 23° C.±2° C.

Result of Luminance Measurement

Results of the luminance measurement is shown in Table 1 and FIG. 12.

TABLE 1

| | EMBODIMENT OF THE INVENTION | | COMPARATIVE EXAMPLE | | | |
| | LIGHT GUIDE-1 | | LIGHT GUIDE-2 | | LIGHT GUIDE-3 | |
| ZONE | LUMINANCE | DISTRIBUTION | LUMINANCE | DISTRIBUTION | LUMINANCE | DISTRIBUTION |
|---|---|---|---|---|---|---|
| 1 | 254 | 0.863 | 895 | 1.000 | 230 | 0.979 |
| 2 | 246 | 0.837 | 650 | 0.726 | 210 | 0.894 |
| 3 | 252 | 0.856 | 440 | 0.492 | 191 | 0.813 |
| 4 | 266 | 0.905 | 293 | 0.327 | 181 | 0.770 |
| 5 | 272 | 0.928 | 204 | 0.228 | 193 | 0.821 |
| 6 | 285 | 0.971 | 146 | 0.163 | 215 | 0.915 |
| 7 | 279 | 0.951 | 110 | 0.123 | 224 | 0.953 |

TABLE 1-continued

| | EMBODIMENT OF THE INVENTION | | COMPARATIVE EXAMPLE | | | |
| --- | --- | --- | --- | --- | --- | --- |
| | LIGHT GUIDE-1 | | LIGHT GUIDE-2 | | LIGHT GUIDE-3 | |
| ZONE | LUMINANCE | DISTRIBUTION | LUMINANCE | DISTRIBUTION | LUMINANCE | DISTRIBUTION |
| 8 | 294 | 1.000 | 87 | 0.097 | 235 | 1.000 |
| 9 | 286 | 0.974 | 73 | 0.082 | 211 | 0.898 |
| 10 | 277 | 0.944 | 64 | 0.072 | 185 | 0.787 |
| 11 | 271 | 0.925 | 55 | 0.061 | 182 | 0.774 |
| AVERAGE VALUE | 271 | | 274 | | 205 | |

According to the light guide 1 which is an embodiment of the present invention, it is possible to radiate emitted light with an approximately uniform luminance over the whole of the light emitting surface and to illuminate a display surface with a uniform luminance. The light guide 1 has a utilization rate of light higher than that of the light guide 3. Therefore, even if the same light source is used, it is possible to obtain emitted light having a high luminance. The surface light source element using the light guide 4 can provide a result similar to that of the surface light source element using the light guide 1.

Measurement of Directional Emitting Angle of the Light Guide

Figure 13:
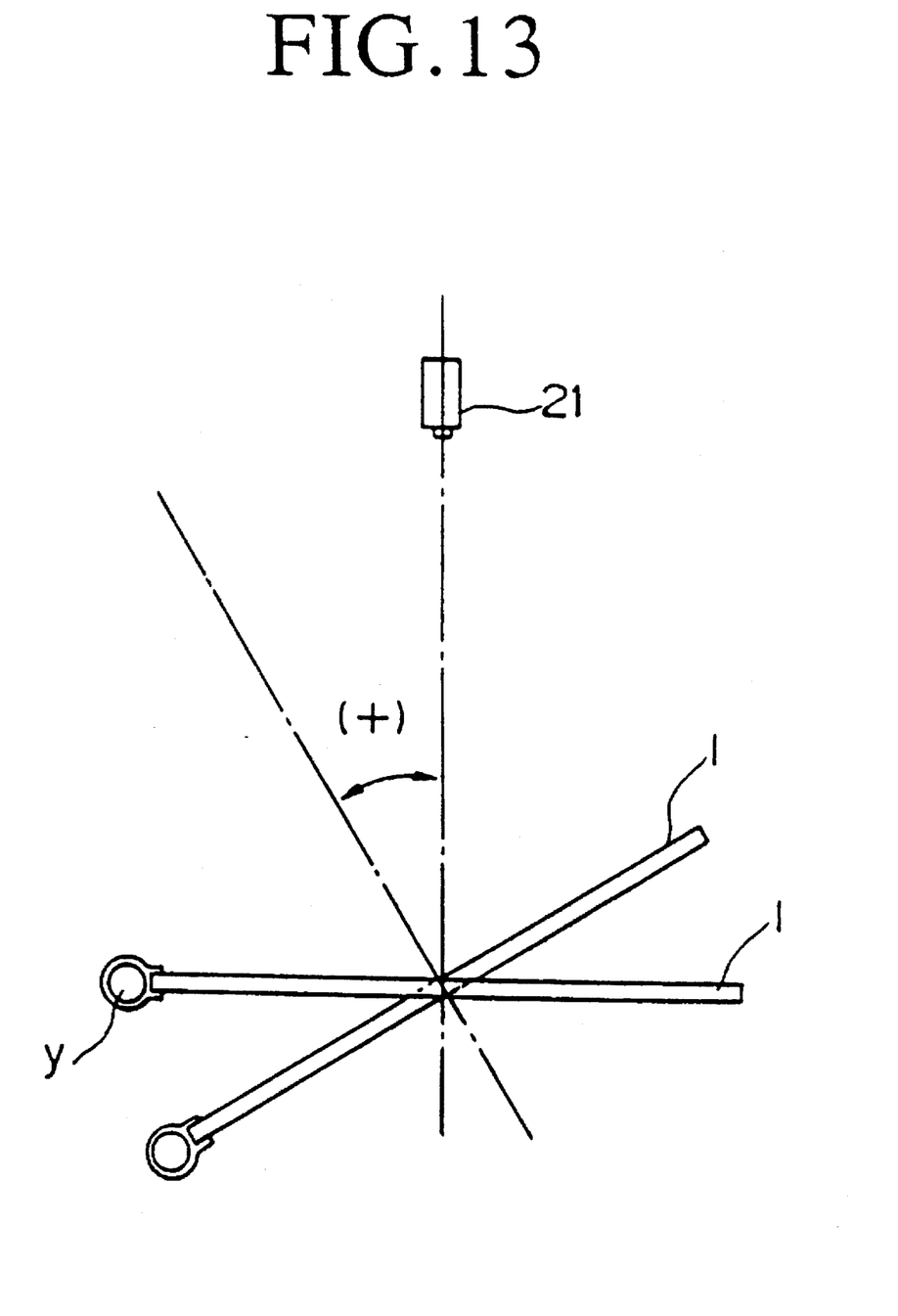
FIG. 13 is a schematic view showing a method for measuring directional emitting angles of a manufactured surface light source element.

A sample was placed on a measurement pedestal so that a lamp y was at the left side. The luminances at predetermined angles were measured, rotating the sample as shown in FIG. 13.

A sample in which a diffusing member was removed from a surface light source element using the light guide 1 is indicated as 1-1. A sample with a diffusing member is indicated as 1-2.

A sample in which a diffusing member was removed from a surface light source element using the light guide 3 is indicated as 3-1. A sample with a diffusing member is indicated as 3-2.

Figure 14A:
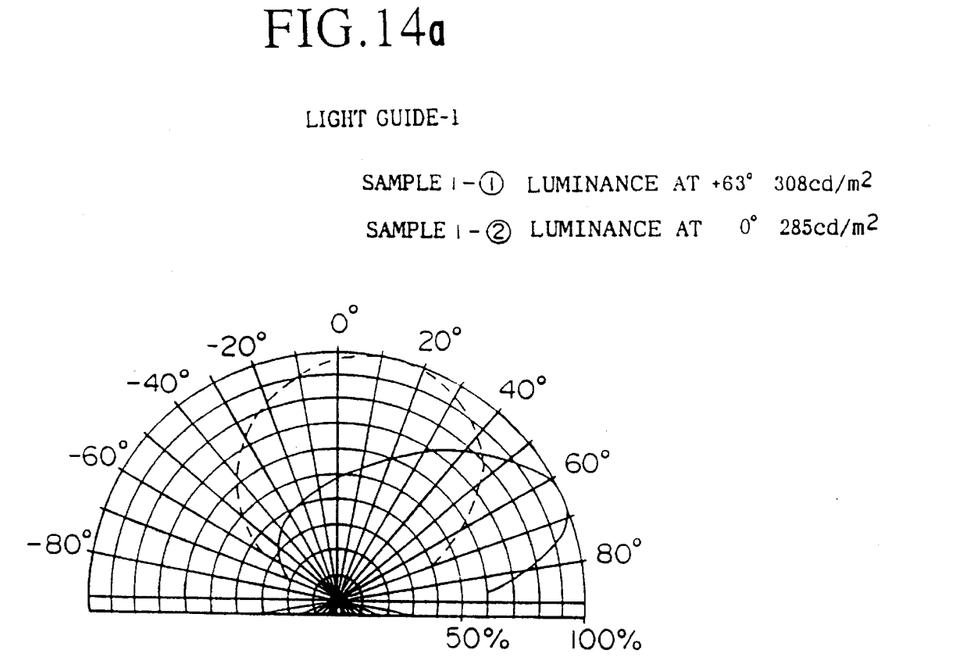
Figure 14B:
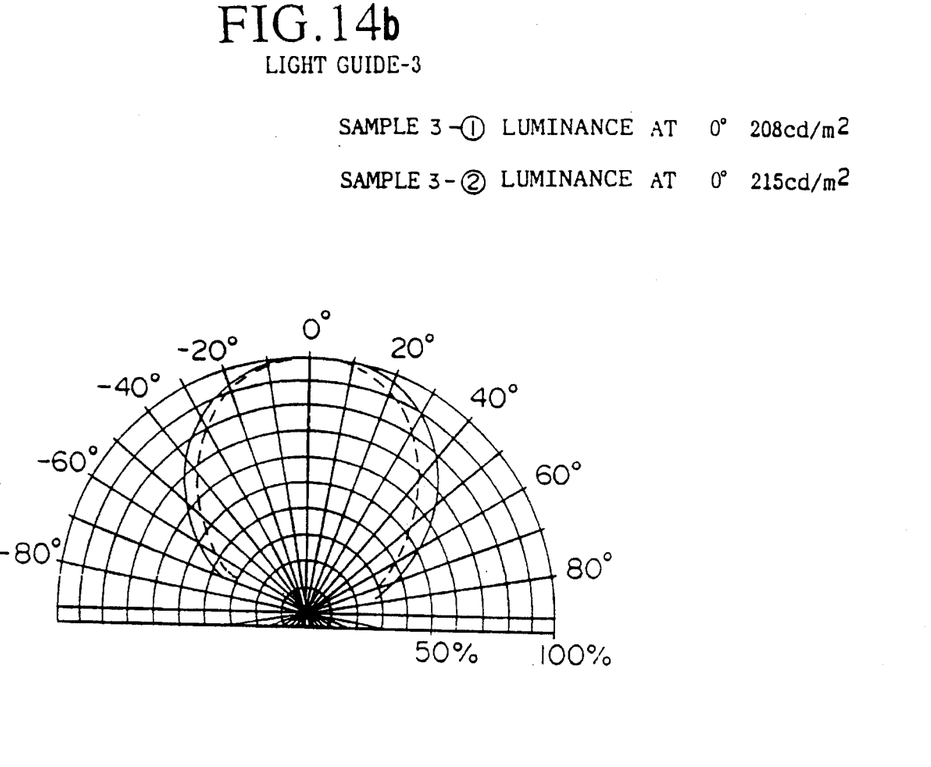

The measurement position was fixed at the central portion of the zone 6 as shown in FIG. 11. The results are shown in FIGS. 14(a) and (b).

UTILIZATION POSSIBILITY IN INDUSTRY

As described above, in the surface light source element according to the present invention, at Least one of the light emitting surface and the opposed surface of said transparent light guide has a directional light emitting function which radiates the incident light from the light incident surface of the transparent light guide at an oblique direction to the incident light and has a regulation function which makes the luminance of the light uniform over the light emitting surface in the whole surface thereof. Therefore, even if the transparent light guide is thin, it is possible to emit light with a uniform luminance over the entire emitting surface on the basis of the incident light. The incident light into the transparent light guide is not wasted and has a high utilization rate. Consequently, it is possible to produce an emitted light having a high luminance without increasing the wattage of the light source. Therefore, the present invention provides a very thin type of surface light source element which can supply emitted light with a uniform and high luminance.

What is claimed is:

1. A surface light source element, comprising:

a cylindrical light source means for generating light;

a transparent light guide having a light incident surface facing the cylindrical light source means, a light emitting surface that is perpendicular to the light incident surface, an opposed surface opposing the light emitting surface, and a light reflecting layer facing the opposed surface;

wherein incident light that is generated by said cylindrical light source means enters said transparent light guide through said light incident surface and propagates along an incident light direction; and a diffusing means for diffusing light exiting from the light emitting surface, said diffusing member facing the light emitting surface;

wherein at least one of the light emitting surface and the opposed surface has flat areas which are optically flat and non-flat areas which are not optically flat and have a haze value of at least thirty percent, whereby said non-flat areas radiate light from the transparent light guide in a direction that is oblique to said incident light direction;

wherein a sum of areas of said flat areas of said at least one of the light emitting surface and the opposed surface decreases with increasing distance from said light incident surface.

2. A surface light source element according to claim 1, wherein said non-flat areas each consists of a plurality of lenses.

3. A surface light source element according to claim 1, wherein said non-flat areas each consists of optically toughened areas.

4. A surface light source element according to claim 1, wherein said transparent light guide consists of an acrylic resin.

5. A surface light source element according to claim 1, wherein said transparent light guide is an injection molded light guide.

6. A surface light source element according to claim 1, wherein said sum of areas of said flat areas decreases with increasing distance from said light incident surface such that luminance of said light emitting surface is uniform over the entire light emitting surface.

7. A surface light source element according to claim 1, wherein said light emitting surface has said flat areas and said non-flat areas.

8. A surface light source element according to claim 1, wherein said opposed surface has said flat areas and non-flat areas.

9. A surface light source element according to claim 1, wherein a ratio of area of said flat areas to area of both said flat areas and said non-flat areas decreases in the direction away from said light incident surface.

10. A surface light source element according to claim 1, wherein both said light emitting surface and said opposed surface have flat areas and non-flat areas.

11. A surface light source element, comprising:

a cylindrical light source means for generating light;

a transparent light guide having a light incident surface facing the cylindrical light source means, a light emitting surface that is perpendicular to the light incident surface, an opposed surface opposing the light emitting surface, and a light reflecting layer provided on the opposed surface;

wherein incident light that is generated by said cylindrical light source means enters said transparent light guide through said light incident surface and propagates along an incident light direction; and a diffusing member for diffusing light existing from the light emitting surface, said diffusing member facing the light emitting surface;

wherein at least one of the light emitting surface and the opposed surface has flat areas which are optically flat and non-flat areas which are not optically flat and have a haze value of at least thirty percent, whereby said non-flat areas radiate light from the transparent light guide in a direction that is oblique to said incident light direction;

wherein a ratio of area of said flat areas to area of both said flat areas and said non-flat areas decreases in the direction away from said light incident surface.

* * * * *